(Model.)
G. MURRAY & M. A. GIBBS.
APPARATUS FOR THAWING GIANT POWDER AND NITRO GLYCERINE.
No. 276,862. Patented May 1, 1883.
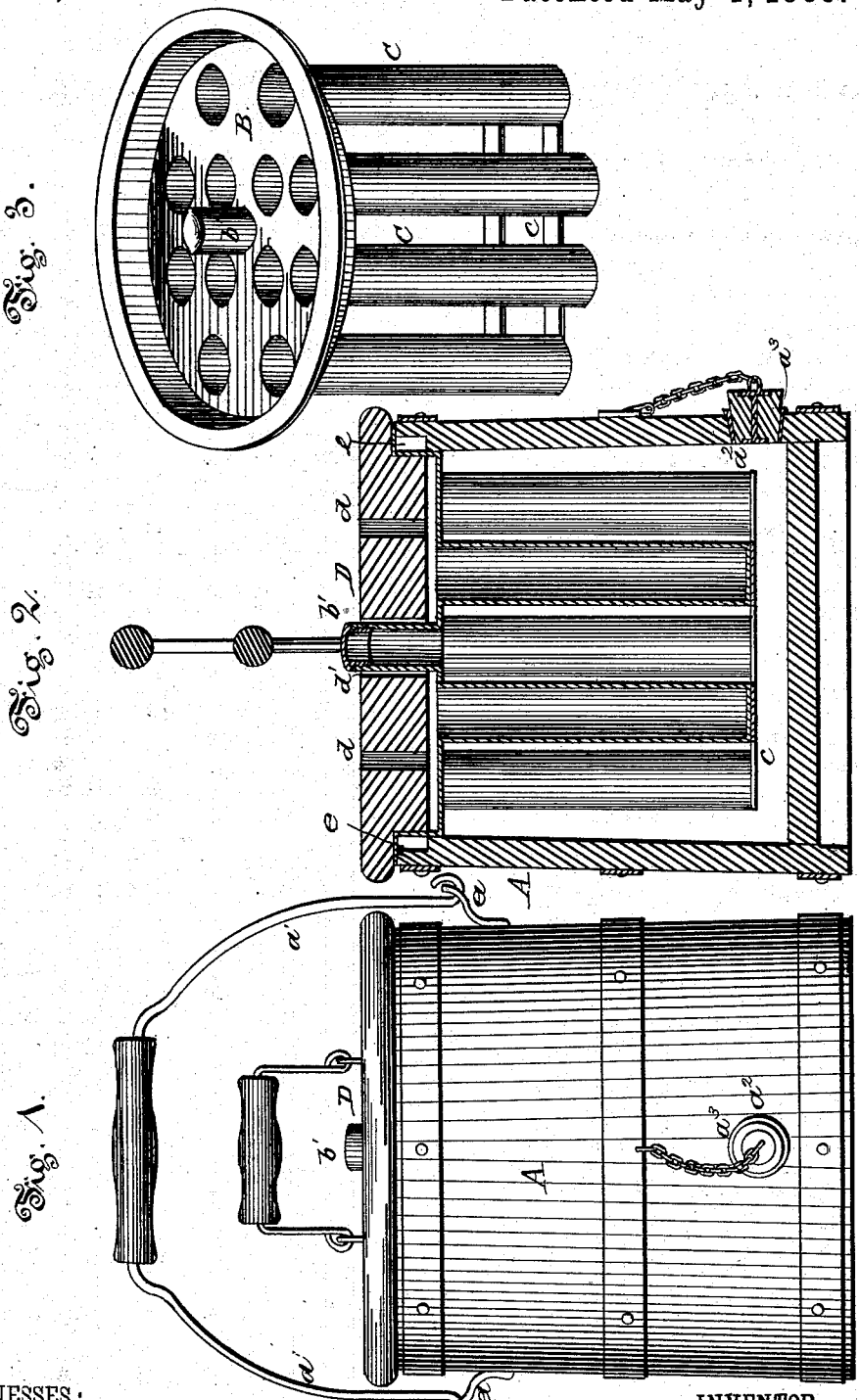
WITNESSES:
Fred. G. Dieterich.
E. C. Wulford
INVENTOR.
Gordon Murray
and Mahlon A. Gibbs
by DeWitt C. Allen
ATTORNEY.

United States Patent Office.

GORDON MURRAY AND MAHLON A. GIBBS, OF NEGAUNEE, MICHIGAN.

APPARATUS FOR THAWING GIANT-POWDER AND NITRO-GLYCERINE.

SPECIFICATION forming part of Letters Patent No. 276,862, dated May 1, 1883.

Application filed January 13, 1883. (Model.)

*To all whom it may concern:*

Be it known that we, GORDON MURRAY and MAHLON A. GIBBS, citizens of the United States, residing at Negaunee, in the county of Marquette and State of Michigan, have invented certain new and useful Improvements in Apparatus for Thawing Giant-Powder and Nitro-Glycerine; and we do hereby declare the following to be a full, clear, and exact description of the invention, such as will enable others skilled in the art to which it appertains to make and use the same.

This invention relates to certain new and useful improvements in apparatus for thawing giant-powder, nitro-glycerine, and other high explosives used in mining and other operations; and the objects of the invention are to avoid accidental explosions, resulting mainly from the shifts resorted to by miners to warm their powder or other explosive material, and loss of time to the workmen consequent in warming the explosives; and to this end the invention consists in novel features of construction and combination of parts, all as will be hereinafter fully described, and set forth in the claims hereto annexed.

Referring to the accompanying drawings, Figure 1 is a side view, Fig. 2 is a vertical central or cross section, and Fig. 3 is a detail view, of the tubes.

In the drawings, A represents a wooden receptacle of circular or other suitable form and size, and provided with ears $a$ and a bail, $a'$, by which it may be conveniently carried in the hand of the miner or workman.

B represents a dish-shaped vessel, having an outwardly-projecting flange, $b$, around its upper edge, by which it is suspended and supported within and from the top edge of the receptacle A.

C are a series of tubes closed at their lower ends and connected by metallic supporting-straps $c$, said tubes projecting up through and secured to the bottom of the vessel B. These tubes C extend downward within the receptacle A, when the vessel B is suspended therein, to a short distance of the bottom, and they are arranged at equal distances apart and from the sides and bottom of the receptacle A, so that all parts of the tubes are equally exposed to the action of the hot water contained in said receptacle.

Over receptacle A, and upon and within vessel B, fits a wooden cover, D, having a series of small vent-holes, $d$, and a central hole, $d'$, the latter of which permits of the passage through it of a central and upwardly-projecting plug or other suitable device, $b'$, for convenience in handling or carrying the cartridge-holder vessel B.

The receptacle A is provided with a hole, $a^2$, through its side and near the bottom, which is closed by a plug, $a^3$, by which it may be emptied of water. This hole, however, may be omitted when deemed expedient, and the receptacle filled and emptied from the top by removing the cover and vessel B, or by unscrewing the plug $b'$, and then using a funnel to fill the receptacle without removing the cover and vessel.

In the use of the apparatus, first put the hot water in receptacle A, then put in vessel B, having the flues C, then fill flues with powder, and place cover D thereon. It will thus be seen that the flues or tubes C are entirely and equally surrounded by the hot water in said receptacle, by which the powder is warmed and thawed and kept in proper condition for use as long as the water is kept warm. By having a wooden receptacle and cover it is not as easily spoiled or damaged and not as liable to explode its contents when striking against any hard or sharp substance, while it will retain the heat much longer than tin, and, also, the wood will last much longer, as water will soon rust tin.

It will be observed that, the vessel containing the tubes being removable, the tubes can be more easily and readily repaired, while the same receptacle for containing the hot water can be used for thawing nitro-glycerine, which may be put up in cans that may be suspended in the receptacle similar to vessel B by merely removing the same. The receptacle A is provided with slots $e\ e$ (shown in the vertical central sectional, Fig. 3) in its upper interior edge, for the reception of a cross-rod having its ends adapted to fit in said slots, upon or from which the cans may be suspended.

As the removable vessel B, containing the flues C, and the cover provided with the vent-holes forms the subject-matter of another application of ours for Letters Patent filed simultaneously with this, they are not claimed broadly in the present case.

Having thus fully described our invention, what we claim as new, and desire to secure by Letters Patent, is—

1. The combination, with a hot-water receptacle, A, of a series of cartridge-holders, C, suspended therein, and a cover for fitting over the tops of said holders, substantially as and for the purpose herein shown and described.

2. The combination of the receptacle A, having the slots $e\ e$ in its upper or top edge, and a removable vessel, B, provided with the cartridge-holders C, and a cover for said receptacle, substantially as and for the purpose herein shown and described.

In testimony whereof we affix our signatures in presence of two witnesses.

GORDON MURRAY.
MAHLON A. GIBBS.

Witnesses:
THOMAS CARMICHAEL,
JNO. SMITH.